March 12, 1968    J. A. HOWARD ET AL    3,372,561
MEANS FOR LIMITING TORQUE TRANSMISSION
Filed March 1, 1966    5 Sheets-Sheet 5

INVENTOR'S
JOHN ARTHUR HOWARD &
ERIC LEONARD MYERS

United States Patent Office 3,372,561
Patented Mar. 12, 1968

3,372,561
MEANS FOR LIMITING TORQUE TRANSMISSION
John Arthur Howard and Eric Leonard Myers, West Horndon, England, assignors to Rotary Hoes Limited, West Horndon, England
Filed Mar. 1, 1966, Ser. No. 530,871
Claims priority, application Great Britain, Mar. 3, 1965, 8,985/65
10 Claims. (Cl. 64—28)

ABSTRACT OF THE DISCLOSURE

A torque-limiting clutch has coaxial power input and power output members, two pressure plates biased together to clamp friction drive elements. Torque is transmitted through torque responsive means having circumferentially spaced opposing end abutments associated with axially spaced side abutments facing the pressure plates such that torque in excess of a predetermined value will move the end abutments toward each other and the side abutments apart to move the pressure plates apart in opposition to the biasing means for reducing the friction drive engagement between said elements.

---

The invention relates to means for limiting the torque which can be transmitted by a friction clutch of the kind having its driving and driven elements normally biased into frictional, torque-transmitting engagement. With a friction clutch of the kind set forth, the variation between the static and dynamic coefficients of friction results in the clutch slipping after having been subjected to a torsional shock load of short duration, and, in some cases, in the drive having to be momentarily discontinued before the static coefficient can reassert itself. In order to avoid such undesirable slipping the initial torque setting has had to be increased above the value which would be adequate for transmitting the torque if the latter were not subject to such shock loads. The object of the invention is to mitigate that disadvantage by cushioning the shock loads and by operating the clutch in a novel way to prevent their transmission.

The means of the invention includes two annuli which are coaxial with the clutch axis and are interconnected by torque-responsive means which will permit of their relative rotation to an extent commensurate with a torque applied between them, and the torque-responsive means, when the applied torque exceeds a predetermined maximum, being such as to engender a force acting axially of the clutch to overcome the bias and permit the clutch to slip.

According to a feature of the invention the annuli are provided with intercalating blades forming a series of compartments between them, and these compartments contain respective, resiliently-compressible blocks which, when the predetermined maximum torque is exceeded, are resiliently extruded in the axial direction to produce a force applied to act in opposition to the bias.

In such a case, and according to a further feature, each of the blocks is of such four-sided cross-sectional shape that when the torque transmitted is less than the predetermined maximum the ends of one diagonal of the block section engage the blades at opposite ends of its compartment and the ends of the other diagonal of the block section are spaced from the said blades, such that the block is distorted in shear as one of said blades approaches the other as the torque transmitted increases to the predetermined maximum, when the block completely fills the compartment, and that an increase in the torque above the predetermined maximum value causes the said blades to extrude the block axially to apply the force to overcome the bias.

Also in such a case, and according to another feature, the blocks in alternate chambers are arranged to transmit the torque in one direction of relative rotation of the annuli, and the blocks in the intermediate chambers are arranged to transmit the torque in the opposite direction of relative rotation of the annuli.

According to yet another feature, in such a case, the blocks in the said alternate chambers have a torque-transmitting characteristic which is different from that of the blocks in the said intermediate chambers, so that the predetermined maximum torques are different from each direction of relative rotation of the annuli.

According to an alternative feature the annuli are respectively connected to diagonally opposite joints of a double toggle device, the intermediate joints being arranged to apply the force to overcome the bias.

According to another alternative feature the annuli are respectively connected to the opposite ends of a piston and cylinder arrangement containing a working fluid which is expressed by an increase of torque into means for producing the force to overcome the bias.

In the accompanying drawings, which exemplify the invention in its application to a clutch in the drive from a tractor power take-off shaft to an agricultural implement supported from the tractor at the rear:

Figure 1:
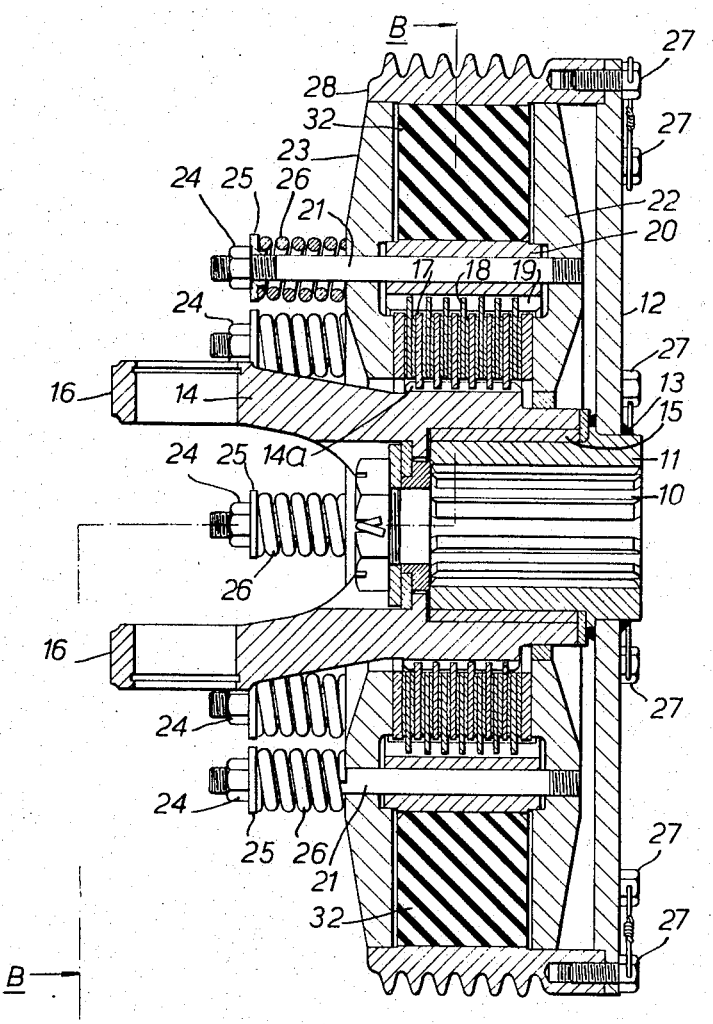
FIGURE 1 is a longitudinal section, the section being on the line A—A of FIGURE 2.
Figure 2:
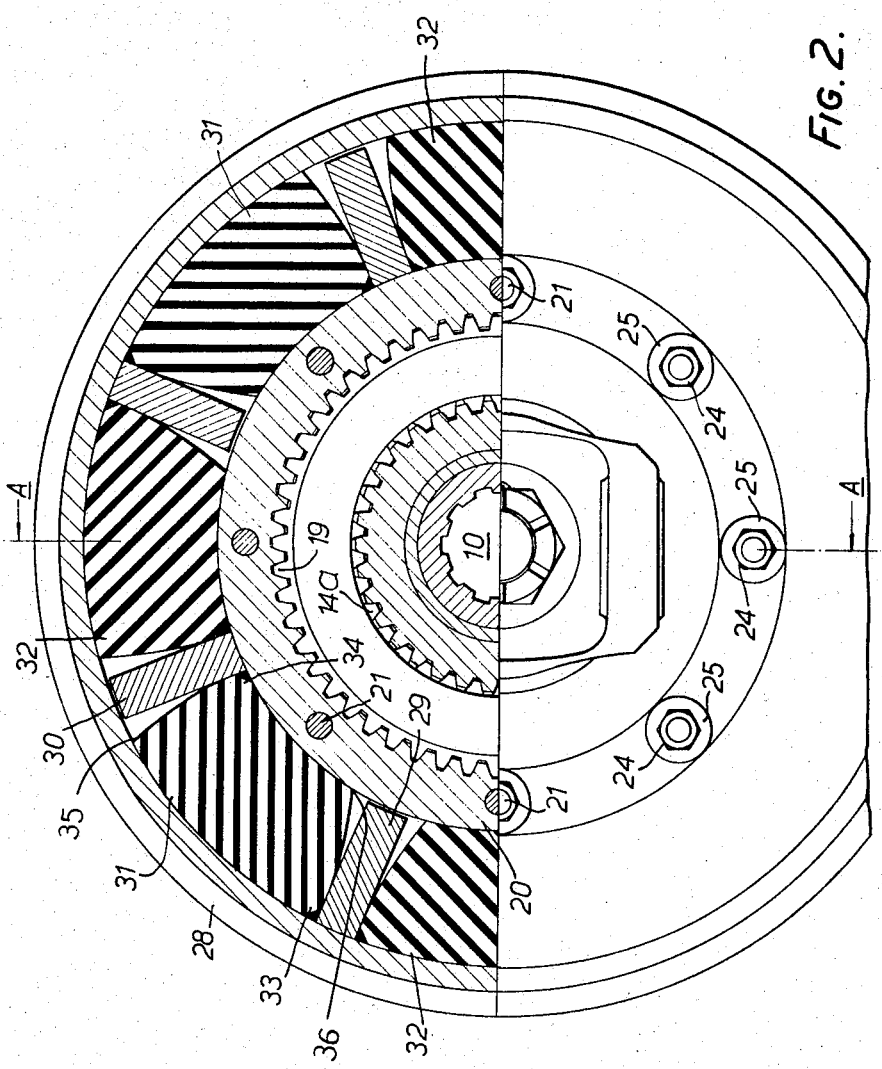
FIGURE 2 is an axial view from the left of FIGURE 1 but with the upper half of the figure drawn in section according to line B—B of FIGURE 1.

Referring to FIGURES 1 and 2, they show a torque transmitting shaft 10 which is splined in a hub 11 having a disc 12 welded to it at 13, and a hollow torque transmitting shaft 14 which at one end encloses the adjacent end of hub 11, with anti-friction material 15 between them and at the other end is integral with a pair of jaws 16 of a universal joint.

Inner and outer annular friction clutch plates 17, 18 are respectively splined at 14a to shaft 14, and at 19 to an annulus 20, and a circular arangement of studs 21, which are screw-threaded into an annular pressure plate 22, extend through aligned bores in the annulus 20 and an annular pressure plate 23, and carry at their extending ends nuts 24 against which react retainers 25 for compression springs 26 which apply the clutch-engaging pressure to pressure plate 23.

Made fast with disc 12, as by a circle of screws 27 is a ring 28 from which pressure plates 22 and 23 have working clearance, and ring 28 and annulus 20 are provided respectively with radial blades 29 and 30 which intercalate, and together with the pressure plates, define a coaxial circle of compartments. Rubber blocks 31 are arranged in alternate ones of these compartments, and rubber blocks 32 are arranged in the intermediate ones.

The blocks 31 and 32 are of the shape shown, and are handed such that when shaft 10 is rotating counter-clockwise in FIGURE 2 and less than the predetermined maximum torque is being transmitted, the radially outer edges 33 of the blocks 31 are in engagement in the angle between ring 28 and the respective blades 29, and their radially inner edges 34 are in engagement in the angle between annulus 20 and the respective blades 30, while the diagonally-opposite edges 35 and 36 of the blocks 31 are clear of the blades 29 and 30 and leave a wedge-shaped space between them. It will therefore be seen that as the torque to be transmitted rises to the predetermined maximum each blade 30 will move counter-clockwise towards the blade 29 of the same compartment and distort the contained block in shear, thus cushioning some of the torque, until the wedge-shaped spaces disappear and the blocks completely fill their respective compartments. When this stage is reached an initial rise in the value of the torque will stress the blocks in compression. If the torque rises to a higher value, the effort of the blades 29 and 30 in compressing the blocks will cause them to seek relief by way of expansion, and this causes them to extrude laterally (i.e., in the direction of the axis of the clutch) to apply a separating force to the pressure plates 22 and 23 against the effort of springs 26. This causes the clutch to slip.

Figure 3:
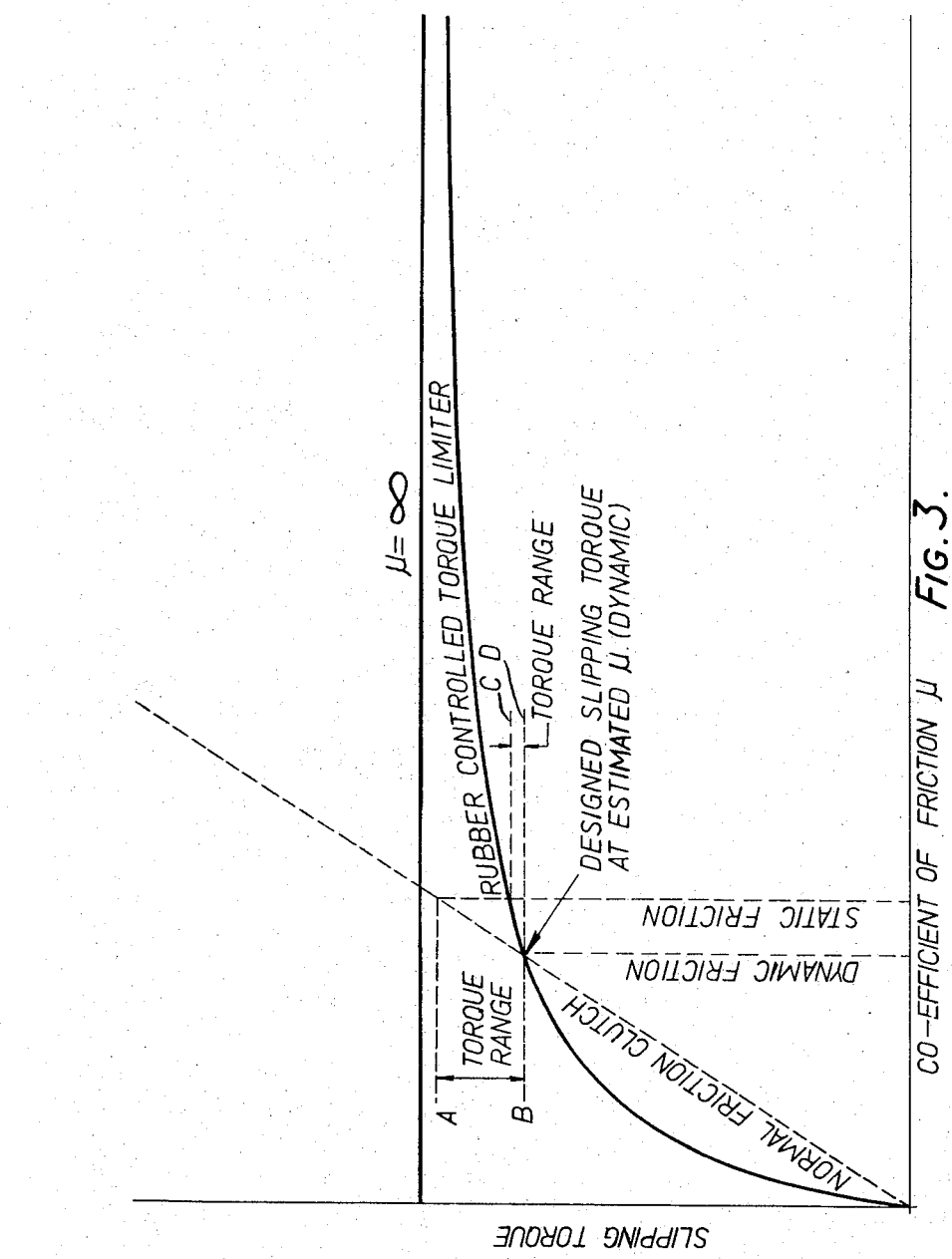
FIGURE 3 is a graph illustrating the reduction of the slipping torque range of a friction clutch in accordance with the invention.

In the particular application illustrated the object of the blocks is to alow the clutch momentarily to slip when a supernormal torque load arises for a short time, for example, if an earth-working blade of the agricultural implement encounters an obstruction, and the effect is illustrated by FIGURE 3. The latter shows between lines A and B the torque range between the static and dynamic friction in an ordinary friction clutch, and between lines C and D the greatly reduced range obtainable by the cushioning means of the invention.

If desired the sizes and/or shapes of the blocks 31 and 32 may be different so as to give the clutch different slipping characteristics when driven in opposite directions.

Reverting to FIGURES 1 and 2 it will be noted that the blocks 32 are placed the reverse way round to the blocks 31, so that the same cushioned application of the shock load to the clutch will occur if the shaft 10 were to be rotated in the reverse direction (i.e., clockwise).

Figure 4:
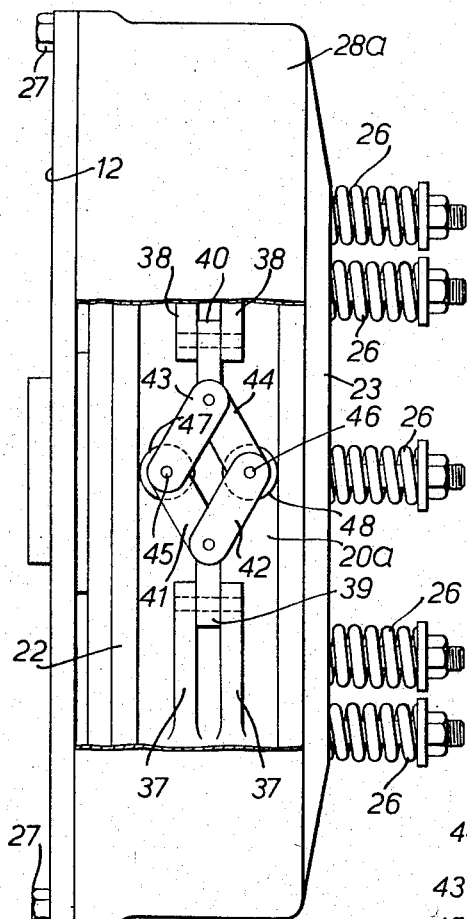
FIGURE 4 is a side elevation, partly broken away, illustrating a first modified construction.
Figure 5:
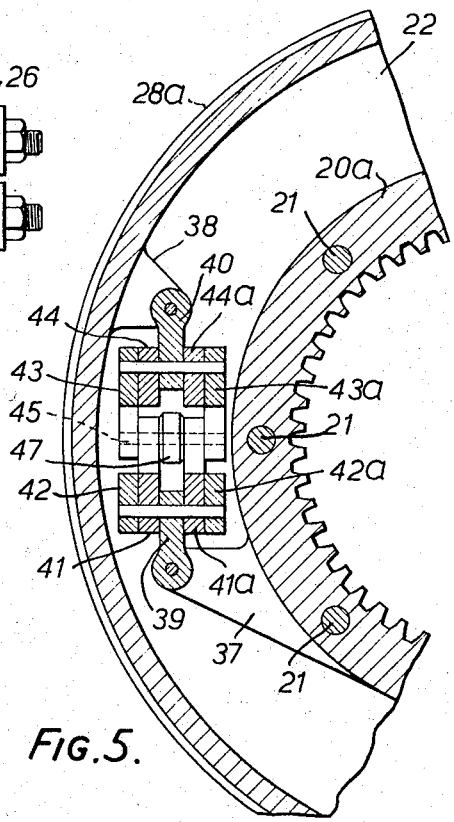
FIGURE 5 is a fragmentary radial sectional view corresponding with FIGURE 4.

In the construction illustrated by FIGURES 4 and 5 the blocks are dispensed with and, instead, the annulus 20a and ring 28a are provided with respective pairs of lugs 37 and 38 between which are pivoted connectors 39, 40 to a double toggle mechanism. Pivotally connected to one side of connector 39 are an upper pair of toggle links 41 and 42, and pivotally connected to the same side of connector 40 are an upper pair of toggle links 43 and 44. The adjacent ends of links 41 and 43, and of links 42 and 44 are pivoted together by respective pivot pins 45, 46 having radially extending flanges 47, 48. Lower pairs of links bearing the same reference numerals, suffixed "a" are connected to the opposite sides of connectors 39 and 40 and to pivot pins 47 and 48. It will be seen that as lugs 37 and 38 approach each other due to an increase in the torque the flanges 47 and 48 react between pressure plates 22 and 23 to overcome the bias exerted by the springs 26. If desired, the flanges 47 and 48 can be replaced by rollers journalled on the pivot pins 45 and 46.

Figure 6:
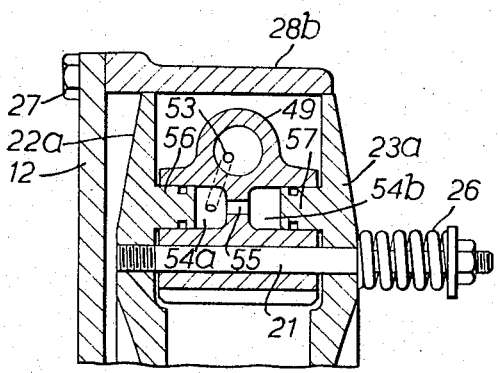
FIGURE 6 is a fragmentary longitudinal section illustrating a second modified construction.
Figure 7:
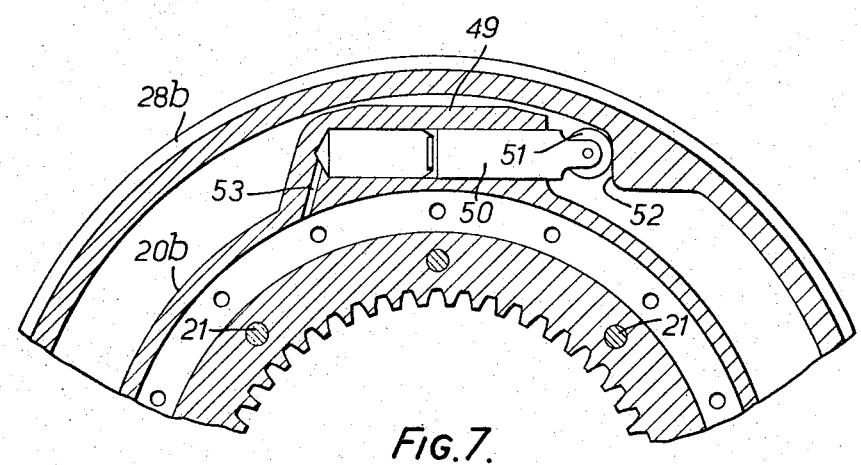
FIGURE 7 is a fragmentary radial sectional view corresponding with FIGURE 6.

In the construction illustrated by FIGURES 6 and 7 the annulus 20b is formed tangentially with a fluid-pressure cylinder 49 in which works a piston 50 having a roller 51 to coact with a step 52 within ring 28b. At its inner end cylinder 49 communicates through a duct 53 with two annular chambers 54a, 54b, which communicate with each other through a circle of ports 55, one only of which is shown in FIGURE 6, in an annular web at the bottom of two coaxial channels formed in the annulus. These channels receive annular pistons 56, 57 respectively formed on the pressure plates 22a and 23a. When the piston 50 is urged into cylinder 49 by an increase of torque, the fluid in annular chambers 54a and 54b separate the pressure plates against the bias of springs 26 to allow the clutch to slip.

The blocks 31 and 32 of FIGURES 1 and 2, or the toggle mechanisms of FIGURES 4 and 5, or the piston and cylinder arrangements of FIGURES 6 and 7 may be arranged to provide back lash or a desired degree of preloading, and the means of the invention can be incorporated in the clutch to be controlled since only pressures are transmitted.

What we claim as our invention and desire to secure by Letters Patent of the United States is:

1. A torque-limiting clutch comprising coaxial power input and power output members, two annular parts coaxial with said members, said annular parts spaced from each other, a friction clutch having coacting friction drive transmission elements coaxial with said members, one of said elements rotatively fast with one of said members, the other of said elements rotatively fast with one of said annular parts, the other of said annular parts rotatively fast with the other of said members, a first set of blades fast with said one annular part and extending towards the other annular part, a second set of blades fast with said other annular part and extending towards said one annular part, said sets of blades intercalated to form an annular series of compartments between said annular parts, respective resiliently compressible blocks in said compartments, said blocks forming torque responsive means interconnecting said annular parts, means normally biasing said elements into friction drive transmitting engagement, and said blocks when a predetermined torque between said annular parts is exceeded being compressed by the relative movement of said sets of blades and extruded in a direction at right angles to that of the compression to produce a force in opposition to said biasing means for reducing the frictional drive transmitting engagement between said elements.

2. A torque-limiting clutch comprising coaxial power input and power output members, two annular parts coaxial with said members, said annular parts spaced radially from each other, a friction clutch having coacting friction drive transmission elements coaxial with said members, one of said elements rotatively fast with one of said members, the other of said elements rotatively fast with said radially inner annular part, said radially outer annular part rotatively fast with the other of said members, a set of radially inwardly extending blades fast with said radially outer annular part, a set of radially outwardly extending blades fast with said radially inner annular part, said blades of said sets intercalated to form an annular series of compartments between said annular parts, respective resiliently compressible blocks in said compartments, said blocks forming torque responsive means interconnecting said annular parts, means normally biasing said elements into friction drive transmitting engagement, and said blocks when a predetermined torque between said annular parts is exceeded being compressed by the relative movement of said sets of blades and extruded in a direction at right angles to that of the compression to produce an axial force in opposition to said biasing means for reducing the frictional drive transmitting engagement between said elements.

3. A friction type clutch according to claim 2 in which each block is so formed that when less than the predetermined torque is being transmitted from one annular part to the other said block engages both blades forming the end walls of the compartment containing the block but does not completely fill the said compartment, an increase in the torque transmitted between the annular parts resulting in the distance between the two blades being reduced and compressing the block until it completely fills the compartment to determine the value of the predetermined torque, and a further increase in the torque transmitted causing the block to be extruded in the axial direction to oppose the bias.

4. A friction type clutch according to claim 3 in which each block is of such shape that when less than the predetermined torque is being transmitted from one annular part to the other the end wall of the block adjacent the blade forming the same end of the compartment containing the block engages the radially inner end of said blade and slopes away from the latter towards its radially outer end to leave a wedge-shaped space therebetween, and the opposite end wall of said block adjacent the blade forming the corresponding end of the said compartment engages the radially outer end of that blade and slopes away from the radially inner end thereof to leave another wedge-shaped space between them, an increase in the torque transmitted between the annular parts resulting in the distance between the two blades being reduced and compressing the block until it completely fills the compartment to determine the value of the predetermined torque, and a further increase in the torque transmitted causing the block to be extruded in the axial direction to oppose the bias.

5. A friction type clutch according to claim 4 in which each block is of such shape that when less than the predetermined torque is being transmitted from one annular part to the other the end wall of the block adjacent the radially outwardly extending blade on the radially inner annular part forming the same end of the compartment containing the block engages the radially inner end of said blade and slopes away from the latter towards the radially outer end of said blade to leave a wedge-shaped space therebetween, and the opposite end wall of said block adjacent the radially inwardly extending blade on the radially outer annular part forming the corresponding end of the said compartment engages the radially outer end of said radially inwardly extending blade and slopes away from the latter towards its radially inner end to leave another wedge-shaped space between them, an increase in the torque transmitted between the annular parts resulting in the distance between the two blades being reduced and compressing the block until it completely fills the compartment to determine the value of the predetermined torque, and a further increase in the torque transmitted causing the block to be extruded in the axial direction to oppose the bias.

6. A friction clutch according to claim 5 in which the blocks in alternate compartments have a torque-transmitting characteristic which is different from that of the blocks in the intermediate compartments.

7. A torque-limiting clutch comprising coaxial power input and power output members, two annular parts coaxial with said members, said annular parts spaced from each other, a friction clutch having coacting friction drive transmission elements coaxial with said members, one of said elements rotatively fast with one of said members, the other of said elements rotatively fast with one of said annular parts, the other of said annular parts rotatively fast with the other of said members, a first set of blades fast with said one annular part and extending towards the other annular part, a second set of blades fast with said other annular part and extending towards said one annular part, said sets of blades intercalated to form an annular series of compartments between said annular parts, respectively resiliently compressible blocks in said compartments, said blocks forming torque responsive means interconnecting said annular parts, said friction clutch comprising a series of parallel friction plates slidable on but rotatively fast with said one of said members and a second series of parallel friction plates slidable on but rotatively fast with said one of said annular parts, said series of plates intercalated, a pair of pressure plates between which said friction plates are sandwiched, and spring means biasing said pressure plates normally to urge said respective series of intercalated friction plates into frictional drive transmitting engagement and said blocks when a predetermined torque between said annular parts is exceeded being compressed by the relative movement of said sets of blades and extruded in a direction at right angles to that of the compression to produce a force in opposition to said biasing means for reducing the frictional drive transmitting engagement between said elements.

8. A torque-limiting clutch comprising coaxial power input and power output members, an annular part coaxial with said members, a friction clutch having coacting friction drive transmission elements coaxial with said members, said elements respectively rotatively fast with one of said members and said annular part, means normally biasing said elements into friction drive engagement, and torque responsive means interconnecting the annular part and the other of said members, said torque responsive means having circumferentially spaced opposing end abutments, one end abutment connected to the annular part and the other end abutment connected to the other of said members, two pressure plates axially spaced apart one at each axial end of said elements, said biasing means normally biasing said pressure plates together for clamping said elements said pressure plates having opposing faces, said torque responsive means having an axially spaced side abutment facing each of said opposing faces, said side abutments connected to said end abutments to move said side abutments apart when said end abutments move toward each other circumferentially, whereby when said torque responsive means transmits torque in excess of a predetermined value, said end abutments will move toward each other and said side abutments will move apart and move said pressure plates apart in opposition to said biasing means for reducing the friction drive engagement between said elements.

9. A torque-limiting clutch according to claim 8 in which there are two annular parts coaxial with the power input and power output members, one of the coacting friction drive transmission clutch elements rotatively fast with one of said members, the other of the coacting friction drive transmission clutch elements rotatively fast with one of said annular parts, and the other of said annular parts rotatively fast with the other of said members, wherein the torque responsive means comprises a toggle lever mechanism interconnecting said annular parts, said toggle lever mechanism having a central pivot laterally off-set from the ends of said mechanism, and means interconnecting said central pivot and the biasing means whereby said central pivot when a predetermined torque between said annular parts is exceeded produces a force in opposition to said biasing means for reducing the frictional drive transmitting engagement between said elements.

10. A torque-limiting clutch according to claim 8 in which there are two annular parts coaxial with the power input and power output members, one of the coacting friction drive transmission clutch elements rotatively fast with one of said members, the other of the coacting friction drive transmission clutch elements rotatively fast with one of said annular parts, and the other of said annular parts rotatively fast with the other of said members wherein the torque responsive means comprises a fluid-filled piston and cylinder arrangement interconnecting said annular parts, fluid pressure actuable means to overcome the bias, said piston and cylinder arrangement, when actuated by a relative rotation of said annular parts by an applied torque exceeding a predetermined value, expressing fluid into said fluid pressure actuable means to produce a force in opposition to said biasing means for reducing the frictional drive transmitting engagement between said elements.

References Cited

UNITED STATES PATENTS

| | | | |
|---|---|---|---|
| 1,632,539 | 6/1927 | Chilton | 64—30 X |
| 1,959,777 | 5/1934 | Bosworth | 64—30 |
| 2,509,061 | 5/1950 | Holcomb | 64—30 X |
| 2,642,971 | 6/1953 | Hagenbook | 64—30 |
| 2,789,420 | 4/1957 | Madden | 64—30 |
| 3,100,974 | 8/1963 | Wilson et al. | 64—30 |
| 3,106,828 | 10/1963 | Burrows | 64—30 |
| 3,122,903 | 3/1964 | Ramsden | 64—30 |

HALL C. COE, *Primary Examiner.*